(12) United States Patent
Bowron et al.

(10) Patent No.: US 7,289,272 B2
(45) Date of Patent: Oct. 30, 2007

(54) OPTICAL SYSTEM INCLUDING AN ANAMORPHIC LENS

(75) Inventors: John W. Bowron, Penetanguishene (CA); Reginald Peter Jonas, Penetanguishene (CA)

(73) Assignee: Raytheon Company, Waltham, MA (US)

( * ) Notice: Subject to any disclaimer, the term of this patent is extended or adjusted under 35 U.S.C. 154(b) by 62 days.

(21) Appl. No.: 11/228,965

(22) Filed: Sep. 16, 2005

(65) Prior Publication Data

US 2007/0081257 A1 Apr. 12, 2007

(51) Int. Cl.
*G02B 13/08* (2006.01)

(52) U.S. Cl. .............. 359/668; 359/207; 359/672; 359/673; 359/674; 359/675; 359/670; 359/671; 359/710

(58) Field of Classification Search .......... 359/668, 359/670–671, 710, 672–675, 207
See application file for complete search history.

(56) References Cited

U.S. PATENT DOCUMENTS

| | | | |
|---|---|---|---|
| 1,040,889 A * | 10/1912 | Conrad .................... 70/10 |
| 3,990,785 A * | 11/1976 | Hirose .................. 359/670 |
| 4,148,550 A * | 4/1979 | MacAnally ............. 359/435 |
| 4,312,017 A * | 1/1982 | Poetsch ................. 348/97 |
| 4,681,405 A | 7/1987 | Balogh et al. |
| 5,283,694 A * | 2/1994 | Frady .................... 359/719 |
| 5,406,042 A * | 4/1995 | Engelfriet et al. ..... 219/121.68 |
| 5,481,321 A | 1/1996 | Lipton |
| 5,668,666 A * | 9/1997 | Suzuki ................. 359/674 |
| 5,691,842 A | 11/1997 | Devenyi et al. |
| 5,745,803 A * | 4/1998 | Ito ......................... 396/83 |
| 5,930,050 A | 7/1999 | Dewald |
| 6,128,132 A * | 10/2000 | Wieland et al. ........... 359/463 |
| 6,317,171 B1 | 11/2001 | Dewald |
| 6,478,429 B1 | 11/2002 | Aritake et al. |
| 6,587,159 B1 | 7/2003 | Dewald |
| 6,678,095 B2 | 1/2004 | Kelly |
| 2002/0063975 A1 | 5/2002 | Kelly |

\* cited by examiner

*Primary Examiner*—Scott J. Sugarman
*Assistant Examiner*—James R Greece
(74) *Attorney, Agent, or Firm*—Leonard A. Alkov; H. Saint St. Julian; John J. Horn (57) ABSTRACT

An optical system includes a primary lens group having a central beam path therethrough and including a front lens group and a rear lens group. An anamorphic lens group lies on the central beam path and is positioned between the front lens group and the rear lens group. The anamorphic lens group includes at least one optically powered anamorphic lens that has different enlargements of a light beam along different axes perpendicular to the central beam path. The anamorphic lens group may be mounted on structure that allows it to be removed from the central beam path. An image transceiver is either an image source that directs a light beam through the primary lens group and the anamorphic lens group, or is an image receiver that receives a light beam through the primary lens group and the anamorphic lens group.

13 Claims, 6 Drawing Sheets

OPTICAL SYSTEM INCLUDING AN ANAMORPHIC LENS

This invention relates to an optical system, and more particularly to an optical system that achieves anamorphic image formation.

BACKGROUND OF THE INVENTION

Theater (cinema) movies are projected in various aspect ratios, where the aspect ratio is defined as the ratio of the width to the height of the projected image as seen on the screen. The most common aspect ratios are the conventional 1.85:1 "flat" image and the 2.35:1 "scope" image. Historically, most televisions and computer displays have a 1.33:1 aspect ratio. High-definition television typically has a 1.78:1 aspect ratio, and many modern televisions are produced with this screen aspect ratio.

Even though there are many aspect ratios in common use, and others may be introduced in the future, the images are typically recorded (i.e., stored) in a "native" format dictated by the physical dimensions of a film (if analog recording for analog playback) or a spatial light modulator (if digital recording for digital playback). The stored native format may have an aspect ratio different from that of the on-screen projected image. To accomplish the conversion between the aspect ratio of the stored native format and the aspect ratio of the on-screen projected format, the image may be projected through an anamorphic lens, in which the image is enlarged along a first transverse axis to a different extent than along a second, perpendicular transverse axis. That is, the recorded image may be asymmetrically stretched. Thus, for example, a 1.33:1 native format may be projected in a 1.85:1 on-screen format.

Available anamorphic lens structures used in cinema projectors are affixed to the existing lens structure of the projector forward of the objective lenses of the projector. Accordingly, the anamorphic lens structures must be large in diameter, and are consequently heavy and cumbersome. They change the balance and structural requirements of the projector when affixed to the projector.

The cinema normally must be equipped to project at least flat and scope movies. The projector lens structure must be changeable between these two formats. Additionally, some cinemas now are made available for business presentations or other uses requiring the projection of images, so that the projector must be capable of supporting 1.33:1 images or other formats. Existing projectors are difficult to convert between these various formats, at least partially because of the anamorphic lens structure.

These same problems may arise for recording devices, particularly digital recording cameras, that receive and record an image.

There is a therefore a need for improved optical systems for recording and projecting images, to permit conversion between different aspect ratios for the recording and projecting. The present invention fulfills this need, and further provides related advantages.

SUMMARY OF THE INVENTION

The present invention provides an optical system that is suitable for recording or projecting anamorphic images. The anamorphic optical system is more compact and lighter than conventional anamorphic optical systems, so that the optical system support may be smaller and lighter than with prior approaches. In some embodiments, the optical system may be readily converted between different anamorphic ratios, or between anamorphic and non-anamorphic imaging, so that a single camera or projector may be used in a wide range of imaging applications.

In accordance with the invention, an optical system comprises a primary lens group having a central beam path therethrough and including a front lens group with an optically powered front lens that is rotationally symmetric about the central beam path, and a rear lens group including an optically powered rear lens that is rotationally symmetric about the central beam path. Preferably, an aperture lies between the front lens group and the rear lens group. The optical system further includes an anamorphic lens group lying on the central beam path and positioned between the front lens group and the rear lens group. The anamorphic lens group includes at least one optically powered anamorphic lens that has a different enlargement of a light beam passing therethrough along a first transverse axis positioned locally perpendicular to the central beam path than along a second transverse axis positioned locally perpendicular to the central beam path and locally perpendicular to the first transverse axis. The anamorphic lens group preferably includes a cylindrical lens, although other anamorphic lens elements, such as those having toroidal, rotationally non-symmetric Zernike, x-y polynomial, biconic, anamorphic asphere, toroid-based asphere, and other anamorphic surface shapes may be used. An image transceiver is either a projected image source positioned to direct a light image on the central beam path sequentially through the rear lens group, through the anamorphic lens group, and through the front lens group, or an image receiver positioned to receive a light image on the central beam path that passes sequentially through the front lens group, the anamorphic lens group, and the rear lens group before reaching the image receiver. The image transceiver may be either analog (e.g., film) or digital, and it may be either an image receiver or an image source.

The positioning of the anamorphic lens group between the front lens group and the rear lens group of the primary lens group allows the anamorphic lens or lenses to be smaller and lighter in weight than the prior approach wherein the anamorphic lenses are mounted forward of the objective lens. Because the movable elements lie internally, between the front lens group and the rear lens group, the length of the optical system does not increase greatly, nor does the diameter of the optical system. The support structure of the optical system is not extended beyond the front lens group, as is required for conventional cantilevered optical anamorphic additions. Consequently, the support structure may be smaller and lighter than would otherwise be the case. There is a better balance of the weight of the optical components, which also reduces the weight of the support structure.

In one embodiment, the optical system further includes an anamorphic lens group mount that allows the anamorphic lens group to be controllably removed from the central beam path. A secondary lens group may be controllably inserted into the central beam path in place of the anamorphic lens group. The secondary lens group may be either an unpowered lens group that provides the same central beam optical path length as the anamorphic lens group, or another powered lens group such as another anamorphic lens group of a different optical power, or some other type of lens group.

Various mechanical mount arrangements of the removable lens groups may be employed. For example, the anamorphic lens group and the secondary lens group may be configured as cartridges to be inserted into and removed from the central beam path. There may instead be a lens-group mount upon which the anamorphic lens group and the secondary lens group (and possibly additional lens groups) are mounted, and which accomplishes controllable insertion into the central beam path and removal from the central beam path of the anamorphic lens group and the secondary lens group. The lens-group mount may be a tumbler lens-group mount with the tumbler axis either perpendicular to or parallel to the central beam path, a carousel lens-group mount, a transverse slider, a two-position zoom slider, or any other operable type. The placement of the removable/insertable lens groups between the front lens group and the rear lens group of the primary lens group allows such a cartridge or lens-group mount to be made smaller and lighter than if the removable/insertable lens groups were mounted in front of the primary lens group.

The present approach allows the optical system of a camera or projector to be highly flexible by permitting convenient conversion between different aspect ratios or other lens features. The placement of the anamorphic lens group and the secondary lens group between the lenses of the primary lens group allows the lenses of the anamorphic lens group and the secondary lens group to be smaller and lighter than would otherwise be the case, which in turn allows them to be mounted for easy insertion or removal.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
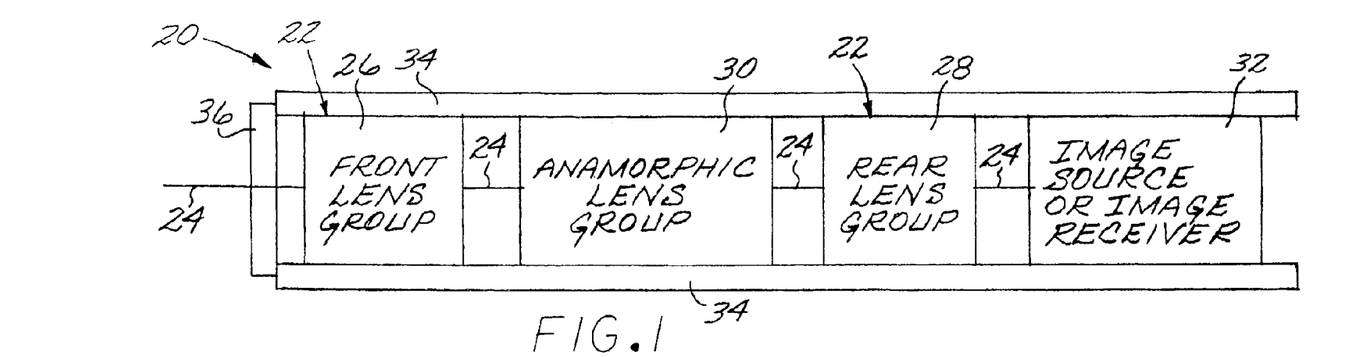
FIG. 1 is a schematic block-diagram depiction of an optical system according to the present approach.

FIG. 1 depicts in block-diagram form an optical system 20 having a primary lens group 22 with a central beam path 24 therethrough. The primary lens group 22 includes a front lens group 26 and a rear lens group 28. An anamorphic lens group 30 lies on the central beam path 24 between the front lens group 26 and the rear lens group 28. The anamorphic lens group 30 may not be placed to the left (in the view of FIG. 1) of the front lens group 26 or to the right (in the view of FIG. 1) of the rear lens group 28. There is an image transceiver 32 that may be either an image source or an image receiver. The present approach may be used with visible or non-visible light such as infrared light, with the proper choice of optical components.

If the image transceiver 32 is an image source, the optical system 20 is a projector, and light travels (from right to left in the view of FIG. 1) on the central beam path 24 successively from the image source 32, through the rear lens group 28, through the anamorphic lens group 30, and through the front lens group 26 toward a screen or other surface upon which the image is projected. An example of an analog image source is a piece of movie film with a light source positioned such that the piece of movie film is between the light source and the rear lens group 28. An example of a digital image source is a digital multimirror device (DMD) with a light source positioned to reflect light from the digital multimirror device along the central beam path 24 toward the rear lens group 28.

If the image transceiver 32 is an image receiver, the optical system 20 is a camera or viewer, and light travels (from left to right in the view of FIG. 1) on the central beam path 24 successively from a scene, through the front lens group 26, through the anamorphic lens group 30, and through the rear lens group 28 to the light viewer. The light viewer could be an eyepiece, but more typically is a recording device. An example of an analog recording device is a piece of film that is exposed. The human eye is another analog image receiver. An example of a digital recording device is a focal plane array which receives the light beam and outputs to a storage device a digitized representation of the light intensities of the pixels that constitute the focal plane array.

The optical system 20 also typically has an optical system support 34 that supports the primary lens group 22, the anamorphic lens group 30, and the image transceiver 32. There may be a window 36 that protects the optical components 22 and 30, and through which the central beam path 24 passes.

Figure 2:
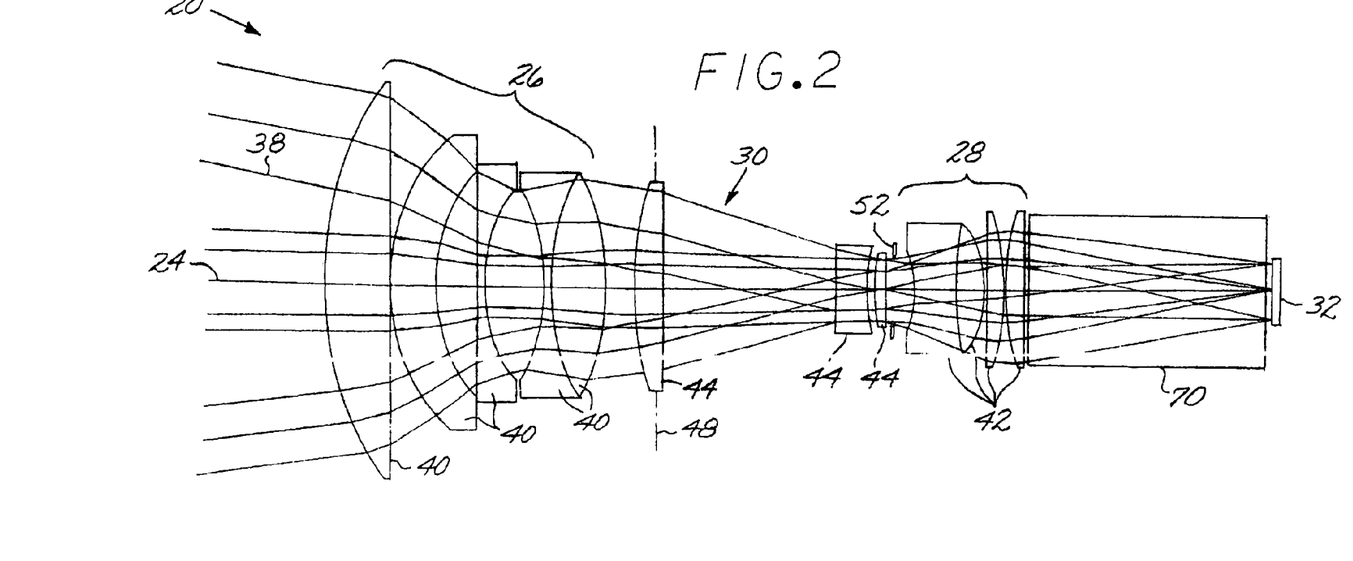
FIG. 2 is a ray path drawing of the optical components of the optical system with a anamorphic lens group.

FIG. 2 depicts in greater detail the optical components of the optical system 20, omitting the optical system support 34 and the window 36. In FIGS. 1-10, common optical components are assigned the same reference numerals, and the appropriate description is incorporated as needed. The optical system 20 is depicted in FIGS. 2 and 5-10 as a projector, the preferred embodiment, and the image transceiver 32 is depicted as the digital multimirror device. In FIGS. 2 and 5-10, optical ray paths 38 are depicted.

The front lens group 26 includes at least one, and in the depiction five, front-lens-group lenses 40. At least one, and preferably all, of the front-lens-group lenses 40 are optically powered and are rotationally symmetric about the central beam path 24. The rear lens group 28 includes at least one, and in the depiction four, rear-lens-group lenses 42. At least one, and preferably all, of the rear-lens-group lenses 42 are optically powered and are rotationally symmetric about the central beam path 24.

There may be provided a prism 70 between the rear lens group 28 and the image transceiver 32. The prism 70 may be, for example, a TIR prism with an optional Phillips prism.

Figure 3:
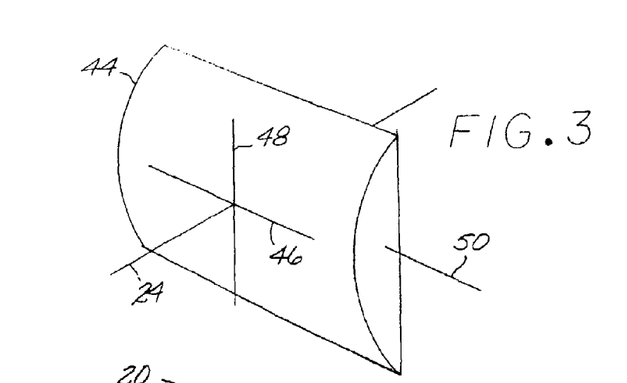
FIG. 3 is a perspective view of a cylindrical lens used in the anamorphic lens group.

Referring to FIG. 2, the anamorphic lens group 30 lies on the central beam path 24 between the front lens group 26 and the rear lens group 28. The anamorphic lens group 30 includes at least one, and in the depiction three, optically powered anamorphic lenses 44. Additionally, there may be one or more nonanamorphic, rotationally symmetric lenses in the anamorphic lens group 30. FIG. 3 illustrates a preferred cylindrical form of the anamorphic lenses 44. The anamorphic lenses 44 have a different enlargement of a light beam passing therethrough, on the central beam path 24, along a first transverse axis 46 positioned locally perpendicular to the central beam path 24 than along a second transverse axis 48 positioned locally perpendicular to the central beam path 24 and locally perpendicular to the first transverse axis 46. In this case, an axis 50 of the cylindrical anamorphic lens 44 is oriented parallel to one of the transverse axes 46 or 48, here illustrated as parallel to the first transverse axis 46. This anamorphic configuration produces the asymmetric "stretching" of the image that is characteristic of the anamorphic lens type. Other forms of anamorphic lenses may also be used where operable, although analysis of the present approach indicates that the use of the cylindrical anamorphic lens is preferred.

Figure 4:
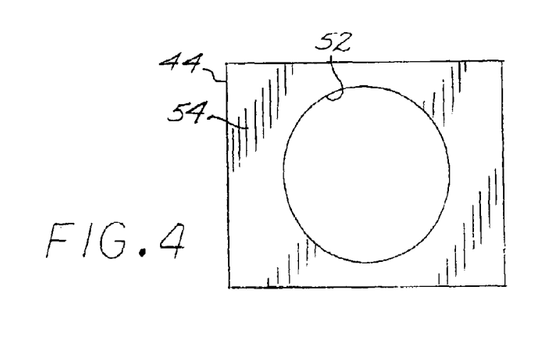
FIG. 4 is a plan view of an aperture.

The optical system also typically has an aperture 52 lying between the front lens group 26 and the rear lens group 28. The aperture 52 may be, for example, a freestanding piece with the aperture 52 provided as an opening therethrough. Alternatively, and as illustrated in FIG. 4, the aperture 52 may instead be one of the lenses, such as one of the anamorphic lenses 44, with a region 54 of the lens surface painted or otherwise rendered opaque to leave the transparent aperture 52 through the opaque region 54. The aperture 52 may have a fixed iris or, in the freestanding version of the aperture 52, a variable iris.

The anamorphic lenses 44 of the anamorphic lens group 30 may be permanently and immovably mounted to the optical system support 34, as depicted in the embodiment of FIG. 2. The anamorphic lenses 44 of the anamorphic lens group 30 may instead be supported and mounted to an anamorphic lens group mount 56 that allows the anamorphic lens group 30 to be controllably inserted into and removed from the central beam path 24. FIGS. 5-10 depict some illustrative embodiments of such selective mounting approaches.

Figure 5:
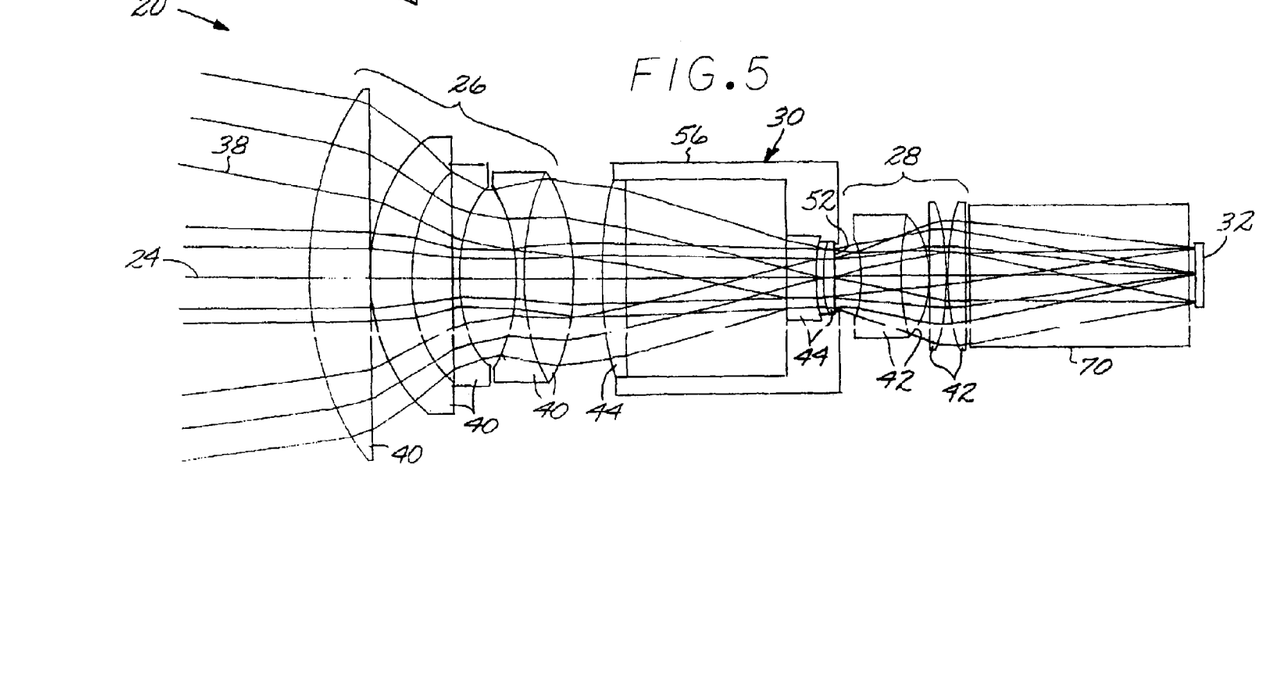
FIG. 5 is a ray path drawing of the optical components of the optical system with a cartridge-mounted anamorphic lens group.

FIG. 5 illustrates the anamorphic lens group mount 56 as a cartridge that is received in a cradle or other support in the optical system support 34 (FIG. 1) and optionally temporarily mechanically locked in place when the anamorphic lens group 30 is to be inserted into the central beam path 24. The cartridge is unlocked and then lifted out of the optical system support 34 to remove the anamorphic lens group 30 from the central beam path 24. The cartridge approach has the advantage that a cartridge and its support may be designed to allow highly accurate, reproducible positioning of the lenses mounted in the cartridge.

Figure 6:
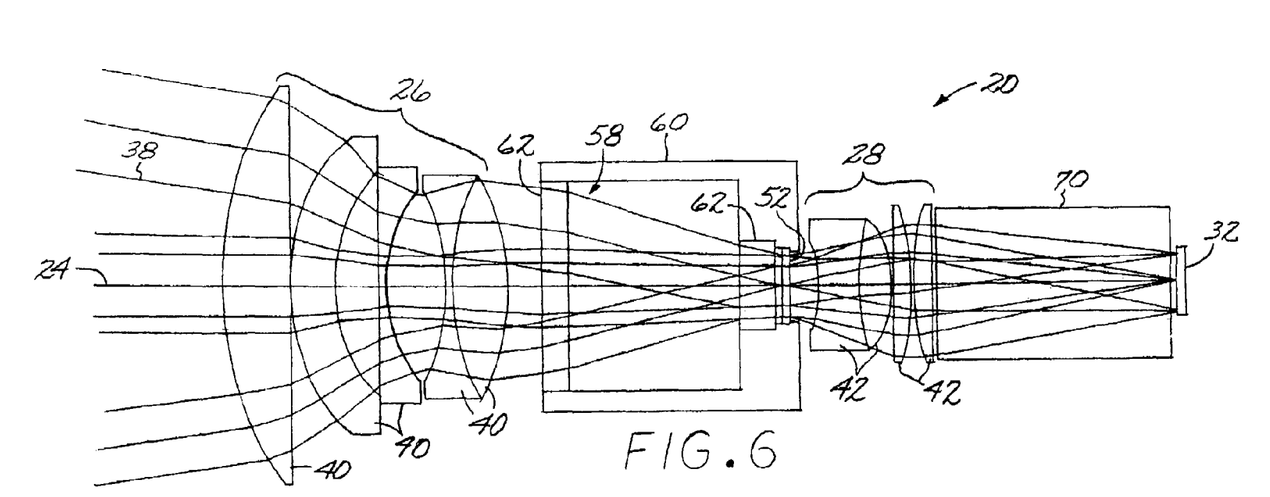
FIG. 6 is a ray path drawing of the optical components of the optical system with a cartridge-mounted secondary lens group.

One advantage to mounting the anamorphic lens group 30 in the removable anamorphic lens group mount 56 is that a secondary lens group 58, illustrated in FIG. 6, may be controllably inserted into the central beam path 24 in its place. As shown, the secondary lens group 58 is mounted in a secondary lens group mount 60 that is structurally interchangeable with the anamorphic lens group mount 56. Thus, the anamorphic lens group mount 56 and the secondary lens group mount 60, and their respective lens groups 30 and 58, may be alternatively inserted into or removed from the central beam path 24.

There may be one or more secondary lens groups 58, which may be alternatively employed instead of the anamorphic lens group 30. The secondary lens group 58 may be of any operable type. For example, it may be another anamorphic lens group to produce a different aspect ratio than the anamorphic lens group 30. It may instead include only optically unpowered secondary lenses 62, as illustrated in the embodiment of FIG. 6. Such a configuration supplies substantially the same central beam optical path length as the anamorphic lens group 30, so that only the lenses of the primary lens group 22 are powered to form the image. The secondary lens group 58 may have an aperture therein, either in a freestanding form or applied to the surface of one of the secondary lenses, as discussed earlier in relation to FIGS. 2 and 4 for the anamorphic lens group 30.

Figure 7:
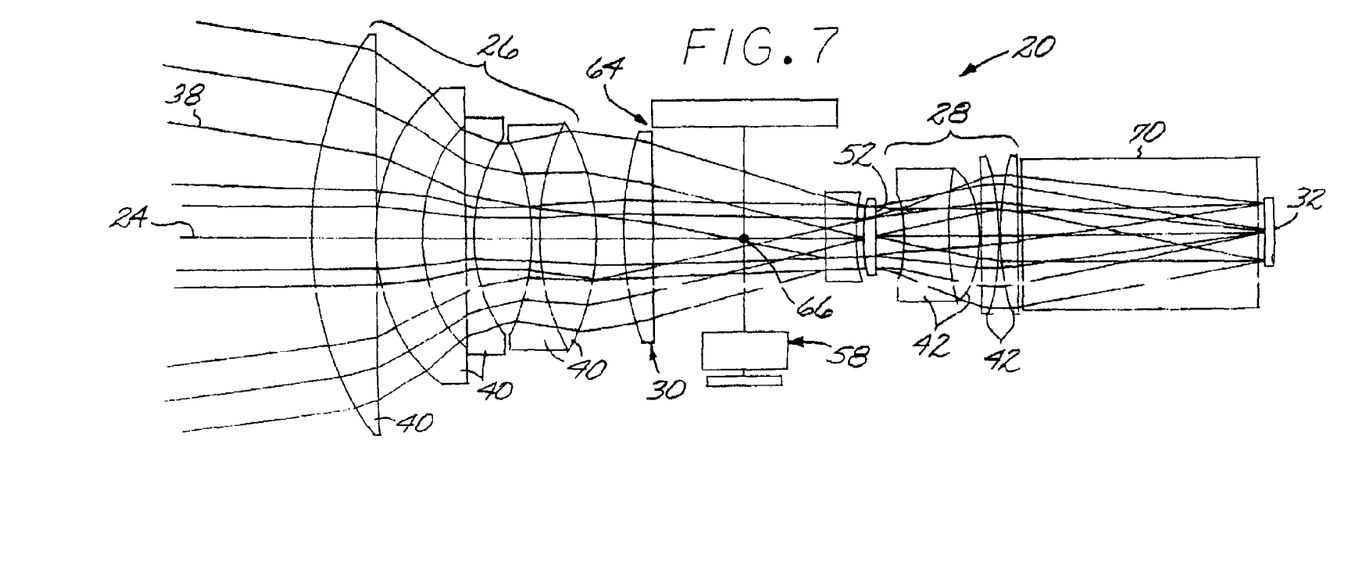
FIG. 7 is a ray path drawing of the optical components of the optical system with a tumbler-mounted anamorphic lens group and secondary lens group, and with the anamorphic lens group in the central beam path.
Figure 8:
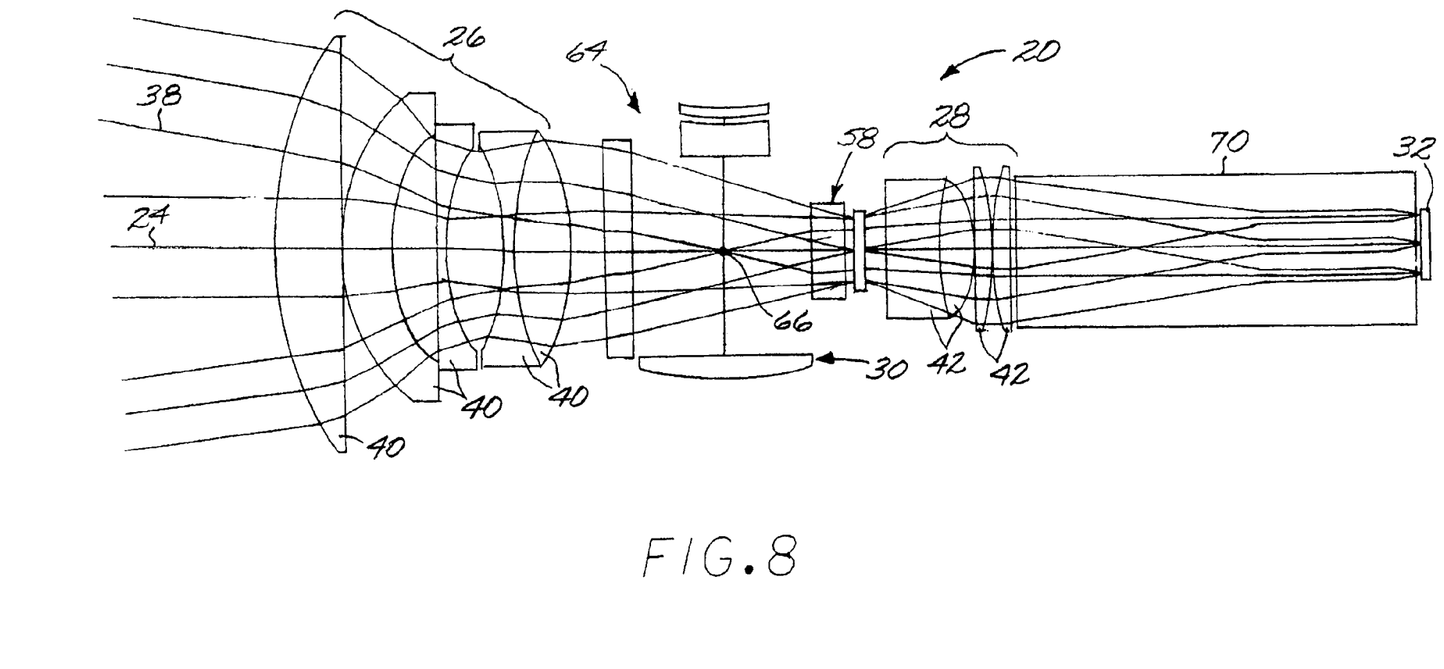
FIG. 8 is a is a ray path drawing of the optical components of the optical system with a tumbler-mounted anamorphic lens group and secondary lens group, and with the secondary lens group in the central beam path.

Instead of separately providing each of the changeable lens groups in removable cartridges, two or more lens groups may be mounted in the lens-group mount, such as a tumbler lens group mount 64 illustrated in FIGS. 7-8. In the tumbler lens group mount 64, two lens groups, the anamorphic lens group 30 and one variation of the secondary lens group 58, are mounted in a structure that rotates about a tumbler axis 66 that is perpendicular to the central beam path 26. Tumbler lens-group mounts that mount three lens groups may be devised, but they are complex in structure. FIG. 7 depicts the tumbler lens group mount 64 rotated to the position wherein the anamorphic lens group 30 is in the central beam path 24, and FIG. 8 depicts the tumbler lens group mount 64 rotated 90 degrees to the position where the secondary lens group 58 is in the central beam path 24. The lens-group mount may of other forms, such as a carousel whose axis of rotation is parallel to, but laterally displaced from, the central beam path 24, with the individual lens groups mounted around the circumference of the carousel. Such lens-mount approaches allow quicker changing between selected lens groups, but generally they offer greater difficulties in maintaining optical alignment of the lens group that is inserted into the central beam path, and are mechanically more complex.

Figure 9:
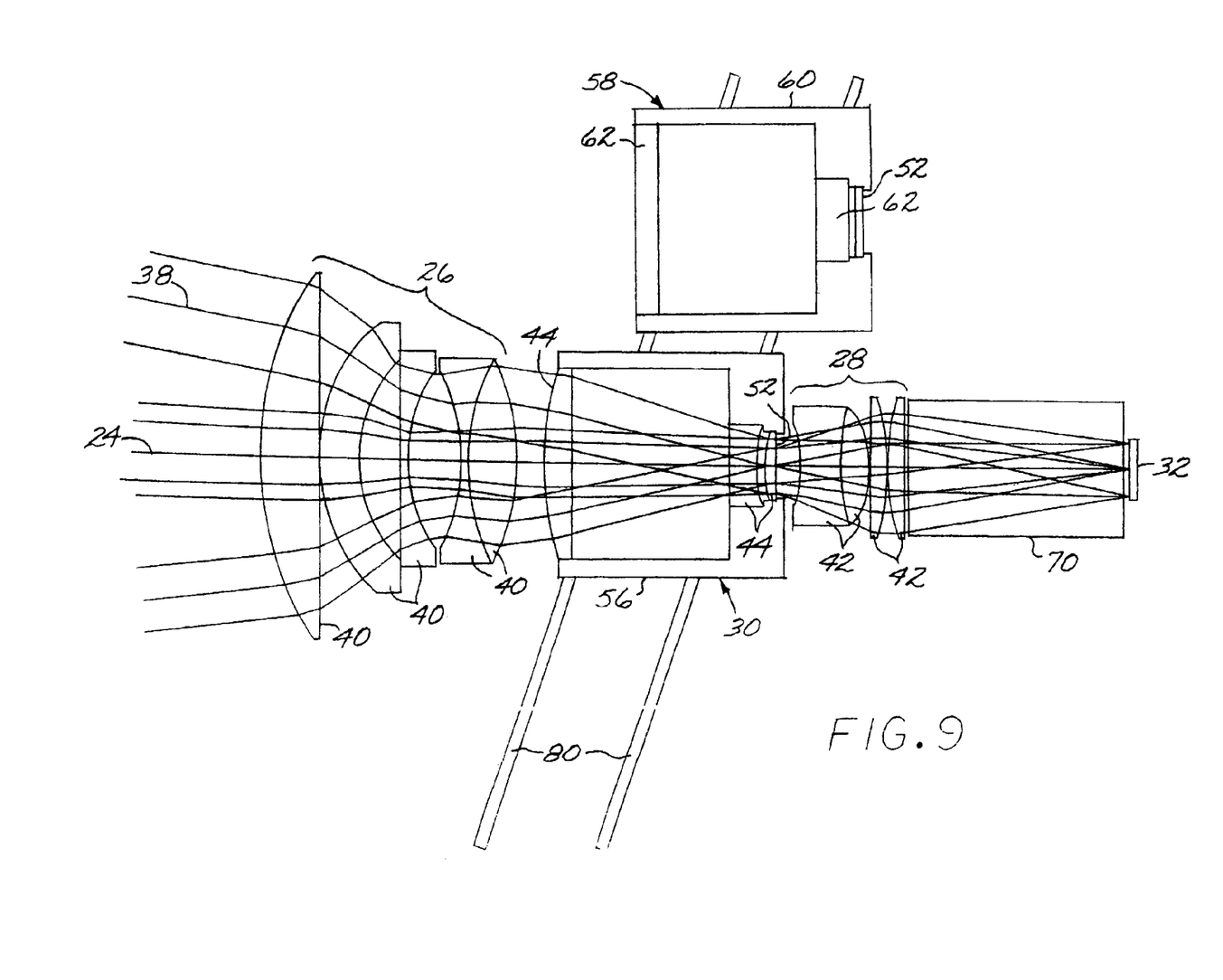
FIG. 9 is a ray path drawing of the optical components of the optical system with the anamorphic lens group and the secondary lens group mounted to a transverse slider, and with the anamorphic lens group in the central beam path.
Figure 10:
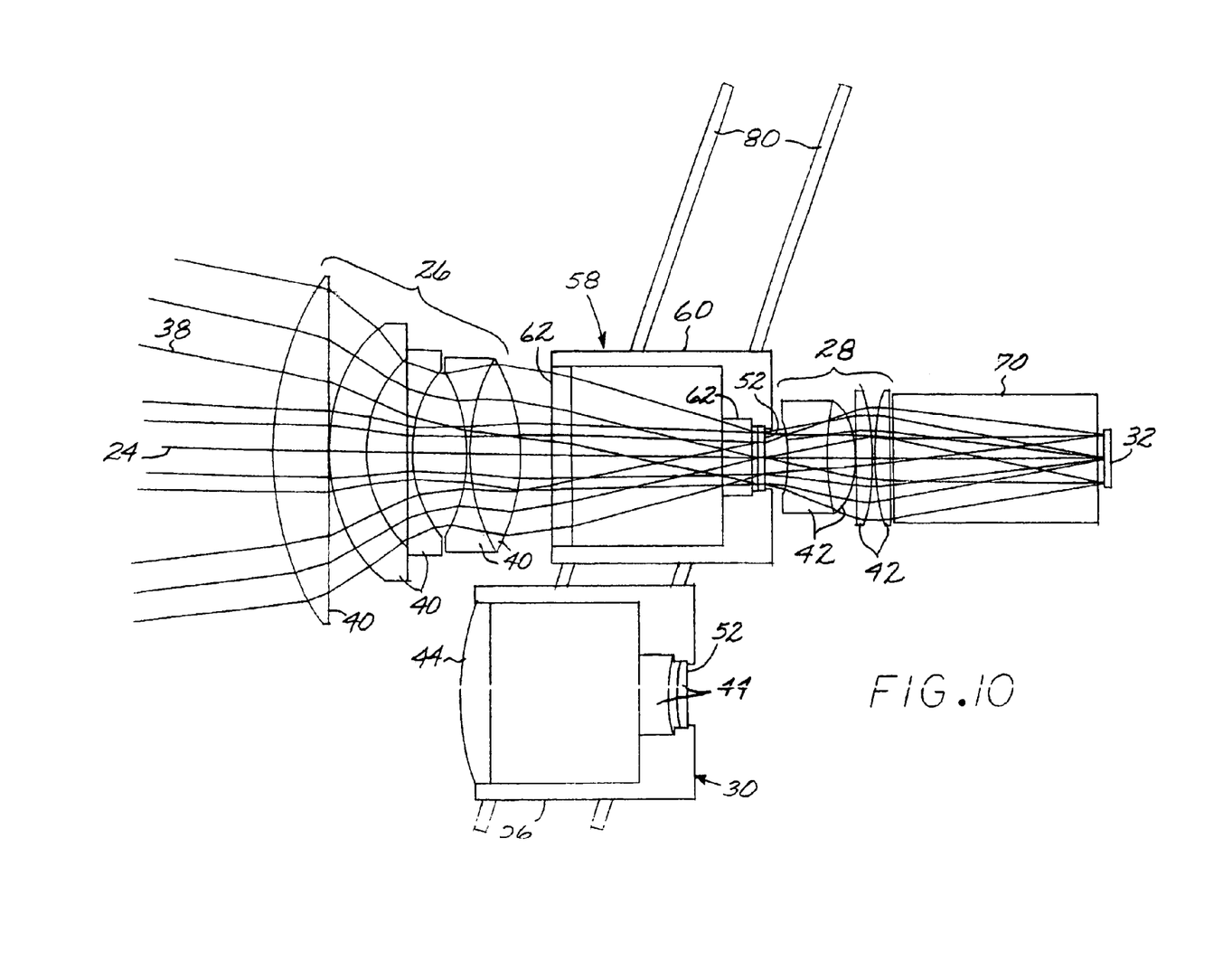
FIG. 10 is a ray path drawing of the optical components of the optical system with the anamorphic lens group and the secondary lens group mounted to a transverse slider, and with the secondary lens group in the central beam path.

FIGS. 9-10 illustrate another embodiment, a transverse slider mount. The anamorphic lens group 30 is supported on the anamorphic lens group mount 56, and the secondary lens group 58 is supported on the secondary lens group mount 60. The anamorphic lens group mount 56 and the secondary lens group mount 60 are both slidably mounted to a transverse rail 80 that extends at a transverse angle to the central beam path 24. The transverse angle may be 90 degrees or some other value, as illustrated. There may be a single transverse rail 80, or more than one transverse rail 80 (two rails 80 in the illustration). The two lens group mounts 56 and 60 controllably slide along the transverse rail 80 so that the anamorphic lens group mount 56, and thence the anamorphic lens group 30, may lie in the central beam path 24, while the secondary lens group mount 60 and thence the secondary lens group 58 are laterally removed from the central beam path 24 (FIG. 9); or, alternatively, the secondary lens group mount 60, and thence the secondary lens group 58, may lie in the central beam path 24, while the anamorphic lens group mount 56, and thence the anamorphic lens group 30, are laterally removed from the central beam path 24 (FIG. 10). This arrangement permits the use of additional lens group mounts, in the manner discussed above in relation to FIG. 6 for the secondary lens group mounts. Thus, there could be three, four, or more lens group mounts supported on the rail 80, but only one set of lenses could be inserted into the central beam path 24 at a time.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system comprising:
a primary lens group having a central beam path therethrough and including:
  a front lens group, including an optically powered front-lens-group lens that is rotationally symmetric about the central beam path, and
  a rear lens group including an optically powered rear-lens-group lens that is rotationally symmetric about the central path;
an anamorphic lens group lying on the central beam path and positioned between the front lens group and the rear lens group, wherein the anamorphic lens group includes at least one optically powered anamorphic lens that has a different enlargement of a light beam passing therethrough along a first transverse axis positioned locally perpendicular to the central beam path than along a second transverse axis positioned locally perpendicular to the central beam path and locally perpendicular to the first transverse axis;
an anamorphic lens group mount;
a secondary lens group;
a secondary lens group mount, wherein the anamorphic lens group mount and the secondary lens group mount respectively enable the anamorphic lens group and the secondary lens group to be alternately and controllably inserted into and removed from the central beam path; and
an image transceiver that is either
  an image source positioned to direct a light image on the central beam path sequentially through the rear lens group, the anamorphic lens group, and the front lens group, or
  an image receiver positioned to receive a light image on the central beam path that passes sequentially through the front lens group, the anamorphic lens group, and the rear lens group before reaching the image receiver.

2. The optical system of claim 1 wherein
the secondary lens group comprises at least one optically unpowered lens group, and wherein all lenses of the optically unpowered lens group taken together have a central beam optical path length substantially equal to a central beam optical path length of the anamorphic lens group.

3. The optical system of claim 1 wherein
the anamorphic lens group mount and the secondary lens group mount are configured as cartridges to be alternately inserted into and removed from the central beam path.

4. The optical system of claim 1 wherein
the anamorphic lens group mount and the secondary lens group mount comprise a mount rotatable about an axis disposed perpendicular to central beam path which accomplishes controllable and alternate insertion into the central beam path and removal from the central beam path of the anamorphic lens group and the secondary lens group.

5. An optical system comprising:
a primary lens group having a central beam path therethrough and including
  a front lens group including an optically powered front lens that is rotationally symmetric about the central beam path, and
  a rear lens group including an optically powered rear lens that is rotationally symmetric about the central path;
an anamorphic lens group lying on the central beam path and positioned between the front lens group and the rear lens group, wherein the anamorphic lens group includes at least one optically powered anamorphic cylindrical lens that has a different enlargement of a light beam passing therethrough along a first transverse axis positioned locally perpendicular to the central beam path than along a second transverse axis positioned locally perpendicular to the central beam path and locally perpendicular to the first transverse axis;
an aperture lying between the front lens group and the rear lens group;
an anamorphic lens group mount;
a secondary lens group;
a secondary lens group mount, wherein the anamorphic lens group mount and the secondary lens group mount respectively enable the anamorphic lens group and the secondary lens group to be alternately and controllably inserted into and removed from the central beam path; and
an image source positioned to direct a light image on the central beam path sequentially through the rear lens group, through the anamorphic lens group, and through the front lens group.

6. The optical system of claim 5 wherein
the secondary lens group comprises at least one optically unpowered lens group, and wherein all lenses of the optically unpowered lens group taken together have a central beam optical path length substantially equal to a central beam optical path length of the anamorphic lens group.

7. The optical system of claim 5 wherein
the anamorphic lens group mount and the secondary lens group mount are configured as cartridges to be alternately inserted into and removed from the central beam path.

8. The optical system of claim 5 wherein
the anamorphic lens group mount and the secondary lens group mount comprise a tumbler mount disposed to rotate about an axis perpendicular to the central beam path to enable alternate controlled insertion and removal of the anamorphic and the secondary lens groups into and out of the central beam path.

9. The optical system of claim 1 wherein the anamorphic lens group mount and the secondary lens group mount comprise a transverse slider mount which accomplishes alternate controllable insertion into the central beam path and removal from the central beam path of the anamorphic lens group and the secondary lens group.

10. The optical system of claim 5 wherein the anamorphic lens group mount and the secondary lens group mount comprise a transverse slider mount which accomplishes alternate controllable insertion into the central beam path and removal from the central beam path of the anamorphic lens group and the secondary lens group.

11. An optical system comprising:
a lens group having a central beam path therethrough and including:
   a powered front lens rotationally symmetric about the central beam path, and
   a powered rear lens rotationally symmetric about the central path;
an anamorphic lens lying on the central beam path and positioned between the front lens and the rear lens;
an anamorphic lens mount;
a secondary lens;
a secondary lens mount, wherein the anamorphic lens mount and the secondary lens mount respectively enable the anamorphic lens and the secondary lens to be interchangeably inserted into and removed from the central beam path.

12. The optical system of claim 11 wherein the anamorphic lens mount and the secondary lens mount comprise a transverse slider mount.

13. The optical system of claim 11 wherein the anamorphic lens mount and the secondary lens mount comprise a tumbler mount having an axis of rotation perpendicular to the central beam path.

* * * * *